(No Model.)  2 Sheets—Sheet 1.
A. W. STAHL & R. GATEWOOD.
F. B. GATEWOOD, Administratrix of R. GATEWOOD, Deceased.
WAVE MOTOR.
No. 574,177.  Patented Dec. 29, 1896.
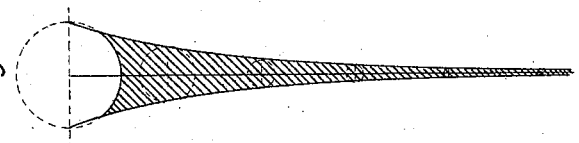
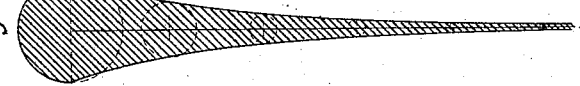
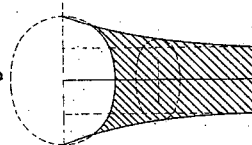
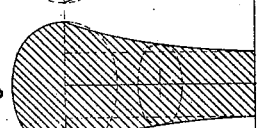
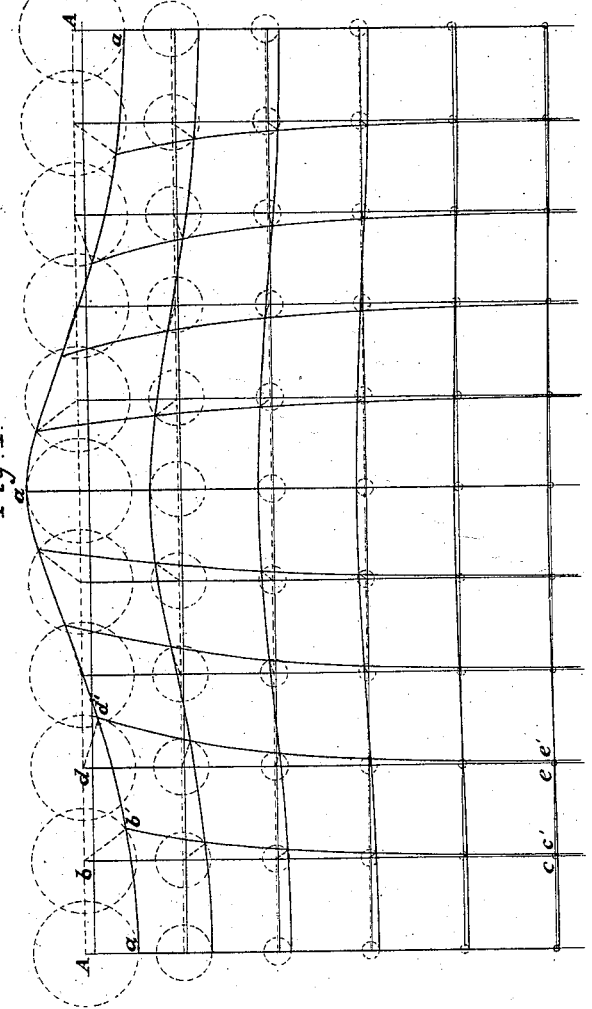
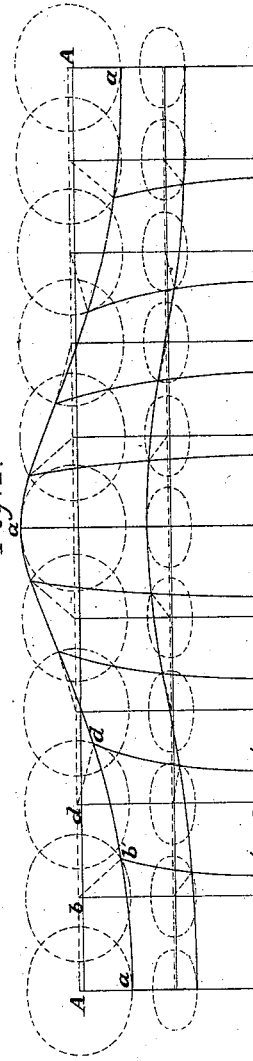
Witnesses  Inventors
  Albert W. Stahl
  Frances B. Gatewood
  Administratrix of the estate
  of Richard Gatewood, deceased.

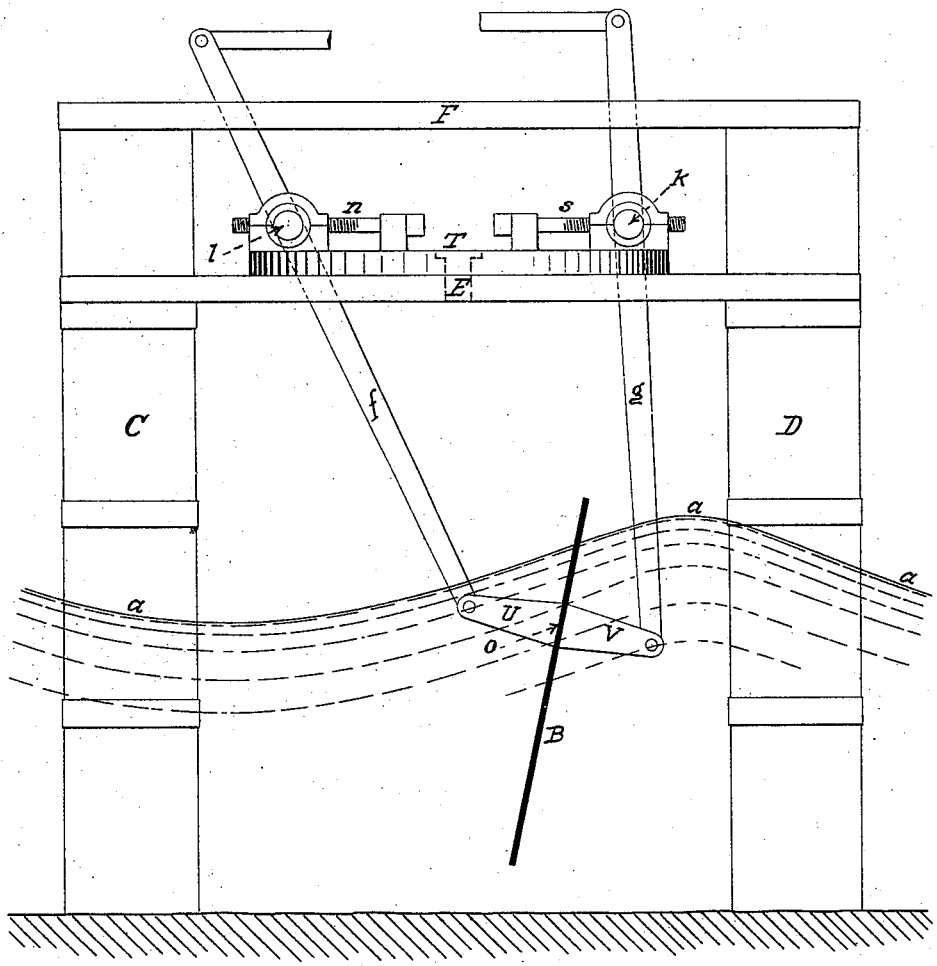

UNITED STATES PATENT OFFICE.

ALBERT W. STAHL, OF THE UNITED STATES NAVY, AND FRANCES B. GATEWOOD, OF ANNAPOLIS, MARYLAND, ADMINISTRATRIX OF RICHARD GATEWOOD, DECEASED.

WAVE-MOTOR.

SPECIFICATION forming part of Letters Patent No. 574,177, dated December 29, 1896.

Application filed March 22, 1892. Renewed December 4, 1896. Serial No. 614,521. (No model.)

*To all whom it may concern:*

Be it known that I, ALBERT W. STAHL, an officer of the United States Navy, and a citizen of the United States of America, now stationed at San Francisco, in the county of San Francisco and State of California, and RICHARD GATEWOOD, late an officer of the United States Navy, and a citizen of the United States of America, residing at Washington, in the District of Columbia, deceased, have invented certain Improvements in Wave-Motors; and the following is hereby declared to be a full, clear, and exact description of the same, reference being had to the diagrams and drawings accompanying this specification and forming a part of the same.

In order that others may understand and apply this invention for utilizing the power of waves, it will be necessary before referring to the mechanism and methods employed, to describe and explain the physical conditions attendant on such wave motion and the relation of these methods thereto.

While the motion of ocean waves in nature is usually quite complex in character, there is a certain simple typical form of such motion to which, or to combinations of which, all ocean waves approximate more or less closely. This form is known as "trochoidal wave" motion, and it is by combinations of this simple wave with others of the same general type that nearly all the complicated motions of the sea are produced. Ocean waves in general thus usually consist of one principal series of trochoidal waves, modified and influenced by other series of somewhat similar but smaller waves of various lengths and directions; and the conclusions to be derived from the study of simple trochoidal waves apply substantially for our purposes to ocean waves in general.

The trochoidal wave is so called from its surface profile, which is the curve known as the "trochoid." From the conditions governing the formation and propagation of the trochoidal wave the following general properties and characteristics of its internal structure and movement have been mathematically deduced, and such deductions have been verified by actual observation and experiment:

Each individual particle of water in a trochoidal wave moves in an elliptical orbit whose major axis is horizontal and the plane of which is vertical and perpendicular to the wave ridge or crest, the motion of the particle in the upper portion of its orbit being in the direction of advance or propagation of the wave itself and in the lower portion of its orbit in the opposite direction. The eccentricity of these ellipses depends on the relation between the length of the wave and the total depth of the water. As this depth of water increases in proportion to the length of the wave the eccentricity of the ellipses becomes less, and they finally become circles when the total depth of water becomes infinite. Practically they cannot be distinguished from circles when the depth of water exceeds about one-half the length of the wave. On the other hand, as the total depth of the water becomes less the eccentricity of the ellipses increases, their horizontal axes becoming much greater than their vertical axes as the water becomes very shallow.

In any given wave all the particles which were originally in the same vertical straight line while the water was at rest describe their respective orbits in the same time and occupy the same phase in these orbits at the same instant; but the orbits themselves become smaller as the distance of the respective particles below the surface increases. In the case of the deep-water wave with circular orbits the circles thus decrease in diameter with increase of depth of the respective particles. In the case of the shallow-water wave with elliptical orbits the ellipses also decrease in size with increase of depth, but their focal distance remains constant. Their vertical minor axes therefore decrease faster than their horizontal major axes, thus rendering the ellipses flatter, as well as smaller, with increased depth of particles. At the bottom the vertical axis disappears entirely and the particles there move in horizontal straight lines whose length is equal to the focal distance of the elliptical orbits of the higher particles. It is to be noted that the above is strictly true only for a perfect liquid with a horizontal and frictionless bottom. Practically the motion is somewhat modified by the actual slope and roughness of the latter and by the viscosity of the water.

The horizontal component of the motion of a particle at any specified depth is equal to the diameter of the respective orbit circle of the major axis of the respective orbit ellipse, as the case may be, and is thus not the same at all depths, but is less as the particle considered is farther from the surface. Hence it follows that a set of particles originally in the same vertical straight line when the water is at rest does not remain in a vertical line during the passage of the wave, so that the line connecting a set of such particles, while vertical and straight in still water, becomes distorted, as well as displaced, during the passage of the wave, its upper portion moving farther and more rapidly than its lower portion.

This invention relates to utilizing the power developed by these movements in accordance with the principles above set forth and further explained in the accompanying drawings, in which—

Figure 1 is a diagram taken on a vertical plane, showing graphically the structure and movement of a deep-water wave as above explained. Figs. 2 and 3 are diagrams taken on a vertical plane, showing graphically the motion during the forward and backward vibration, respectively, of the line connecting an originally vertical set of particles in the deep-water wave of Fig. 1. Fig. 4 is a diagram taken on a vertical plane, showing graphically the structure and movement of a shallow-water wave as above explained. Figs. 5 and 6 are diagrams taken on a vertical plane, showing graphically the motion during the forward and backward vibration, respectively, of the line connecting an originally vertical set of particles in the shallow-water wave of Fig. 4. Fig. 7 shows a vane suspended from points above the surface of the water in such a manner as to permit it to move in general conformance with the motion of the distorted verticals above referred to, the rotation of the vane about its horizontal axis being independently regulated to cause it to approximate to their general direction.

Similar letters of reference on the different figures indicate corresponding elements or parts.

Referring to Fig. 1, the line A A is the original still-water level. $a\,a\,a$ is the profile of the assumed deep-water wave, and the dotted line above, A A, is the center line of the orbit circles for the surface particles. The circular orbits of some of these particles are shown dotted, the position of the orbit radius in each case showing the phase of the respective particle. Similar elements are shown for virtual subsurfaces at successively equal depths below the surface, thus illustrating the gradual decrease in motion with increasing depth below the surface. The lines $bc\,de$, &c., are the originally vertical straight lines connecting a set of particles in still water, previously referred to, which become displaced and distorted during the passage of the wave. In the particular phase represented by Fig. 1 they occupy the positions $b'c'\,d'e'$, &c.; and during the passage of one complete wave each such originally vertical line passes by a continuous motion through the positions and shapes shown in the diagram and through all intermediate positions and shapes. Each such originally vertical line moves as a whole in alternately opposite directions, its upper end having the greater and more rapid motion and always curving toward the nearest wave crest, be the same approaching or receding, the line, as a whole, passing through a vertical phase at the passage of each successive crest and trough of the wave across such line. Considering any such distorted vertical then, its extreme positions are evidently found by drawing curves passing through and connecting the ends of the horizontal diameters of the orbit circles at different depths, as shown in Figs. 2 and 3, the line passing from one of its extreme positions to the other, with its upper end describing the upper half of the surface orbit circle during the forward vibration, Fig. 2, and the lower half of the surface orbit circle during the backward vibration, Fig. 3. Thus the entire area swept over by each such vertical during the forward vibration is that shown hatched in Fig. 2, having for its upper boundary the upper half of the orbit circle, while the area swept over by each such vertical during the backward vibration is that shown hatched in Fig. 3, being a somewhat similar figure, but having for its upper boundary a curve practically agreeing with the lower half of the surface orbit circle.

By substituting for the orbit circles in Figs. 1, 2, and 3 the orbit ellipses corresponding to any particular shallow-water wave we obtain the corresponding diagrams, Figs. 4, 5, and 6, the main practical difference being a diminution in the maximum curvature of the distorted verticals, accompanied by an increase in their translation or displacement as a whole.

Considering in Fig. 1 or Fig. 4 a theoretical surface which was originally in still water a vertical plane perpendicular to the direction of advance of the assumed wave, such surface during the passage of the wave will move in alternately opposite directions, but its upper end will have the greater and more rapid motion, curving in alternately opposite directions toward the nearest wave crest. The surface as a whole will during the forward vibration sweep through a volume whose section is shown by the hatched portion of Fig. 2 or Fig. 5, as the case may be, and during the backward vibration a volume whose section is shown by the hatched portion of Fig. 3 or Fig. 6. If we conceive this theoretical surface to be replaced by an extremely thin and flexible metallic vane, the latter will evidently during the passage of each wave be subjected to a similar displacement as a whole in alternately opposite directions and to a bending in alternately opposite directions toward the nearest wave crest. If such vane be placed in still water and caused by suitable mechanism to assume and pass through all the successive positions and shapes of a distorted vertical corresponding to any particular trochoidal deep or shallow water wave, a certain expenditure of power will be required and the corresponding wave will be produced. Conversely, it follows that by means of suitable mechanism a certain amount of power can be derived from a vane of this kind, which by the passage of a wave is caused to undergo the motions described. Should such vane be made rigid instead of flexible, it would still have approximately the same motion of translation as the flexible vane, but instead of bending in detail to conform to the exact shape of the distorted verticals it would slant as a whole toward the nearest wave crest, taking at any instant the average direction of their curvature along its length. While a flexible vane would theoretically be best as interfering least with the normal structure and movement of the wave, yet the increased complexity in mechanism required would more than counterbalance the gain in power, so that for practical purposes a rigid vane is to be preferred. Such vane should, in general, be made as light and thin as is consistent with proper strength and rigidity and should extend from somewhat above the surface of the water to near the bottom. It is also to be noted that the above description of the movements of the wave applies strictly only to the more or less regular swell outside the breakers, and it is in these waves outside the breakers that for greatest efficiency such vane with its mechanism should be located.

The preferable method of suspending the vane B in any actual case depends on the depth of the water and on the range of variation in the usual magnitude and direction of the waves.

When, as is usually the case, the water is so shallow in proportion to the length of the wave that the orbits of the particles are quite elliptical, in which case there is considerable horizontal motion at the bottom, the vane is preferably suspended from above at a point of its length near the mean height of the center of pressure.

For any given depth of water the curvature of the distorted verticals, as well as their translation or displacement as a whole, depend on the dimensions of the wave, and for any given wave the curvature and the translation of such distorted verticals bear a definite proportion to each other. These two motions can be computed or determined experimentally for any particular contour of bottom, depth of water, and size of wave; and the vane can by suitable mechanism be caused to rotate about a horizontal axis while undergoing the motion of translation imparted to it by the wave, this motion of rotation being regulated to bear at all times the proper proportion to the motion of translation.

In Fig. 7, $a\ a\ a$ is the wave profile, and B is a vane of the kind just referred to. To the vane B are rigidly secured the crankarms U and V, each of which is supported by and pivoted to another crank $f$ and $g$, respectively, the latter being supported and pivoted at the points $l$ and $k$. By means of this mechanism any translation or displacement of the vane B as a whole is accompanied by a proportionate rotation of the same about the axis O, the proper ratio between these two motions for any particular series of waves being secured by suitably adjusting the distance between the bearings $l$ and $k$ by means of the screws $n$ and $s$. The power due to both translation and rotation is taken off by the cranks $f$ and $g$ and transmitted by connecting-rods at their upper ends, or by any other equivalent method, to suitable pumping or other mechanism for utilizing or storing this power.

In order to adjust the vane B about a vertical axis to suit the direction of the waves, a turn-table T is provided, which, by suitable mechanism, is turned and adjusted to any desired position and properly secured after adjustment. This turn-table T supports and carries with it the bearings $l$ and $k$, the screws $n$ and $s$, the vane B, and all other necessary parts. This turn-table T may be dispensed with when the contour of the coast or other influences cause a practically constant direction of the waves.

C D, &c., are firmly-braced structures supporting the platforms or floors E and F, the turn-table T, and the vane B. On the platforms or floors E and F or within the structures C D, &c., can be placed the pumping or other mechanism for transmitting, utilizing, or storing the power derived from the waves by means of the vane B and the mechanism for adjusting and securing the turn-table T.

The energy of the forward vibration of the distorted verticals is greater than that of their backward vibration, and the vane will thus not vibrate equally in both directions if the same resistance is opposed to it during both vibrations. The proper and regular working of the vane can be insured either by opposing a suitable smaller effective resistance to the motion of the vane during the backward than during the forward vibration, or by opposing to the forward vibration of the vane, in addition to the equal effective resistance opposing both vibrations, a suitable additional resistance so arranged as to yield up during the backward vibration the potential energy thereby stored up during the forward vibration. The former method simply requires that the amount of power derived from the vane on the forward and backward vibrations, respectively, is to be adjusted to correspond to the normal energy of the distorted verticals during these respective vibrations. The latter method is most simply carried out by the raising of a free weight or the extension or compression of a spring during the forward vibration, the potential energy of which is then allowed to assist the backward vibration. The irregularity of the vibrations which would be induced by a current can be rectified in a similar manner.

Having thus described the nature and objects of the invention, what is claimed as new, and desired to be secured by Letters Patent, is—

1. In a wave-motor, the vane B, suspended, as shown in Fig. 7, at some point along its length conformable to the depth of water and the motion of the distorted verticals of wave motion, as hereinabove explained; the crank-arms U and V, rigidly connected to the vane B; the cranks $f$ and $g$, pivotally connected to the cranks U and V and provided with bearings $l$ and $k$; the screws $n$ and $s$ for adjusting the distance between the bearings $l$ and $k$, so as to cause a certain predetermined ratio to exist between the rotation of the vane B and its translation or displacement as a whole; all arranged and operating substantially in the manner and for the purposes herein set forth and specified.

2. In a wave-motor, the combination of the turn-table T, the bearings $l$ and $k$, the screws $n$ and $s$, the crank-arms U and V, the cranks $f$ and $g$ and the vane B suspended as shown in Fig. 7; all arranged and operating substantially in the manner and for the purposes herein set forth and specified.

In testimony whereof we have hereunto affixed our signatures in the presence of two witnesses.

ALBERT W. STAHL.
FRANCES B. GATEWOOD,
*Administratrix of the estate of Richard Gatewood, deceased.*

Witnesses to signature of Albert W. Stahl:
B. W. STEELE,
G. L. KIRBY.
Witnesses to signature of Frances B. Gatewood:
JNO. RANDALL MAGRUDER,
D. R. MAGRUDER.